United States Patent [19]

Savic

[11] Patent Number: 5,416,724
[45] Date of Patent: May 16, 1995

[54] DETECTION OF LEAKS IN PIPELINES

[75] Inventor: Michael Savic, Ballston Lake, N.Y.

[73] Assignee: Rensselaer Polytechnic Institute, Tory, N.Y.

[21] Appl. No.: 959,143

[22] Filed: Oct. 9, 1992

[51] Int. Cl.⁶ .................... G01M 3/24; G06G 7/57
[52] U.S. Cl. .................... 364/509; 364/510; 73/40.5 A; 73/592
[58] Field of Search ........... 73/40.5 A, 40.5 R, 49.2, 73/592, 49.2 R, 49.2 T; 364/509, 510

[56] References Cited

U.S. PATENT DOCUMENTS

| | | | |
|---|---|---|---|
| 4,001,764 | 1/1977 | Holland et al. | 73/40.5 A |
| 4,289,019 | 9/1981 | Claytor | 73/40.5 A |
| 4,543,817 | 10/1985 | Sugiyama | 73/40.5 A |
| 4,583,406 | 4/1986 | Dimeff | 73/40.5 A |
| 4,858,462 | 8/1989 | Coulter et al. | 73/40.5 A |
| 5,117,676 | 6/1992 | Chang | 73/40.5 A |
| 5,134,876 | 8/1992 | Robertson et al. | 73/40.5 A |
| 5,163,314 | 11/1992 | Maresca, Jr. et al. | 73/40.5 R |
| 5,272,646 | 12/1993 | Farmer | 73/40.5 R |

OTHER PUBLICATIONS

Spectral Analysis of Sound and Vibration Measurements: Cepstrum Analysis; Bruel & Kjaer Seminar Held Nov. 29, 1989.

Primary Examiner—Emanuel T. Voeltz
Assistant Examiner—Eric W. Stamber
Attorney, Agent, or Firm—Notaro & Michalos

[57] ABSTRACT

An apparatus and process for determining the existence and location of a leak in an underground pipe, comprises a plurality of remote acoustic transmission sensor units distributed along the pipe and each containing equipment for analyzing acoustic signals from the pipe. The equipment includes a mechanism for identifying acoustic features of the acoustic signals which distinguish the acoustic signals of a leak from ambient acoustic signals. A control unit is connected to each of the remote units and includes additional equipment for further analyzing the signals to determine the proximity of the signal to a particular remote unit and, using the amplitude of the signal and the transmission characteristics of the pipe, determining the location of the leak.

4 Claims, 12 Drawing Sheets

DETECTION OF LEAKS IN PIPELINES

FIELD AND BACKGROUND OF THE INVENTION

The present invention relates in general to leak detectors, and in particular to a new and useful system for detecting leaks along a pipeline, on a continuous and reliable basis.

Transport systems for hazardous gases are prone to leaks that can create dangerous situations in a very short time. Currently, available methods for continuously monitoring gas-carrying, buried pipelines are limited to detection of relatively large leaks. There is a great need for a system that can reliably detect smaller leaks and still be economical to implement and use.

Small leaks from underground gas-transport pipelines can cause pressure drops that are too small for existing systems to detect. However, a small leak can quickly generate a gas cloud. If such a cloud is ignited, an explosion that can cause a great deal of damage will result. Such pipelines can also run close to or right under populated areas and even a small explosion can cause sever property damage and loss of life. The early detection of small leaks is, therefore, very important so that appropriate action can be taken to avoid a catastrophe.

Continuous leak monitoring of long pipelines is not a simple task. Leaks can be detected in two general ways. The first is by detecting the substance that escapes the pipe, the second is by detecting certain leak-related properties such as pressure drops, acoustic emissions, volume balance changes and temperature changes.

In order for the first method to succeed, a sensor that detects the leaking substance has to be in physical contact with this substance and, therefore, has to be in close proximity to the leak. This requires a dense concentration of sensors and, thus for a long pipeline, will yield a large number of remote units and high costs. One such method uses a monitoring vehicle to drive above a buried pipeline, checking for the presence of escaping substance. The disadvantage of this method is that it is not a continuous monitoring system and, thus, a leak occurring between trips can release a large amount of gas before it is detected. Another system uses an underground cable, buried just above the pipeline, that is sensitive to the substance in the pipe. When a leak occurs, the part of the cable that is exposed to the leaking material changes in some property that is detectable from the monitoring station. Such cables tend to be costly, especially for long pipelines, not only in initial investment, but also in maintenance. Furthermore, the cables that are currently available are sensitive only to petroleum products.

The second general method identified above, uses indirect ways to detect the presence of a leak. Temperature monitoring and volume balance comparison (comparing the amount of material injected into the pipe to the amount received from the pipe) techniques are useful for the detection of large, catastrophic leaks, and are widely used today. These systems, however, are not sensitive to small leaks. There are several systems available today that detect leaks by acoustic emissions using a portable device that listens to the sound of the leak in the air. Again, the disadvantage of such a device is its inability to constantly monitor the full length of longer pipelines. See R. C. McMaster, Editor, *Non Destructive Testing Handbookl*, Vol. 1: "Leak Testing". Am. Soc, Of Metals, 1982.

SUMMARY OF THE INVENTION

The system of the present invention detects leaks by monitoring the acoustic emission that the leak generates. The sound generated by the leak propagates through the metal walls of the pipe and through the substance flowing through the pipe, and thus can be detected some distance away. Digital signal processing and pattern recognition techniques are used to detect these leak sounds and alert the user of their presence.

The system of the invention comprises sensing and signal analysis units placed at a predetermined distance from each other along the entire length of the pipeline. The distance is chosen in such a way that at least one unit is able to detect the sound of a leak. These units communicate with a central station that is used as an interface between the system and the pipeline monitoring personnel.

Unlike other leak detection systems, this invention approaches the problem for the signal processing point of view. As this has never been done before, the development of the system started by determining the sound transmission characteristic of the buried pipeline, modeling these characteristics and determining the maximum remote sensing unit separation. The invention further involves analyzing the nature of the acoustic leak signals and selecting features that best represent these signals. The usefulness of the invention has also been evaluated through actual tests in the field and extensive simulation. The invention includes embodiments of the central station and the remote units, as well as communication schemes and protocols.

Major advantages of this invention include:
1. A new approach and solution to the continuous leak monitoring problem;
2. Estimation of the acoustic signal attenuation in buried pipelines using a distributed parameter acoustic model of the buried pipeline;
3. Recognition of leak shape and size from the leak acoustic signal and automatic discrimination of leak signals from other man-made or natural sounds;
4. Evaluation of the leak recognition system error as a function of leak size, background noise level and distance of the detector from the leak source;
5. A new, adaptive, signal-matched method for removal of background pipeline noise for increased accuracy in signal detection and discrimination; and
6. Estimation of the location of the leak.

Accordingly, an object of the present invention is to provide a system for detecting leaks in a pipeline which utilizes a plurality of acoustic sensor units distributed at regular intervals along the length of underground pipeline, each capable of collecting and analyzing data, and a central station connected to the acoustic sensor units for locating the occurrence of a leak in the pipeline, by analysis of acoustic signals generated by the leak, and further for discriminating between acoustic signals caused by leaks in the pipeline, and other acoustic signals not related to leaks in the pipeline.

A further object of the invention is to provide a practical, continuous-operation, reliable and relatively inexpensive system for detecting leaks in an underground pipeline, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Unlike known systems available today, the system of the present invention performs a continuous monitoring of the underground pipeline through the acoustic emission of the leak.

Figure 1:
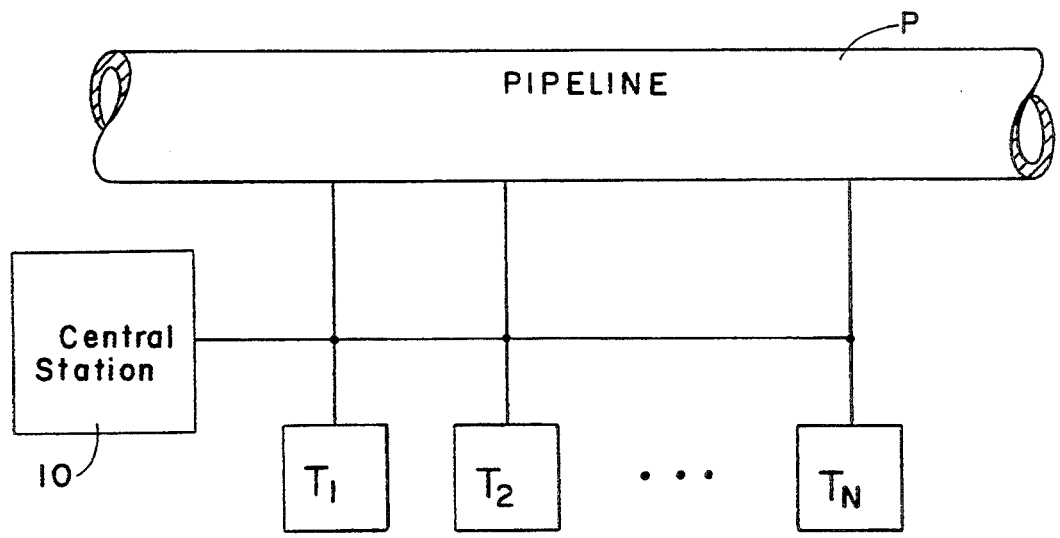
FIG. 1 is a schematic block diagram showing the apparatus of the invention applied to an underground pipeline.

The system of the invention as schematically illustrated in FIG. 1, uses acoustic sensors $T_1, T_2 \ldots T_N$, placed at regular intervals along an underground pipeline P. Sensor units $T_1$ through $T_N$ are remote data collection and analysis units that span the entire length of the pipeline. If a leak occurs, it will be located between two of these units. The sound of the leak will then propagate through the metal in the pipe P, and through the substance flowing through the pipe, and will be detected by at least one of the units.

The units continuously "listen" to the acoustic state of the pipe, decide on the type of the signals present, and communicate their finding to a central station 10 that is connected to the units. The final decision about the presence of the leak is made by the central station. This station is used for coordinating the remote units and communicating the pipeline status to monitoring personnel. While the remote units analyze the instantaneous nature of the signals in the pipe and decide whether or not a leak signal is present, the central station considers "big picture" parameters such as the duration of the leak signal and whether remote units agree upon the nature of the signal.

The goal of the invention is to continuously monitor the acoustic state of the pipe. Without a leak present anywhere along the pipe, the remote units $T_1$-$T_N$ will pick up flow sounds, compressor and pump noises, and external sound sources such as trains and cars. When a leak is present, the system is able to detect it and discriminate its sound from all other sounds occurring in or outside the pipe. At least one of the remote units detects the sound of a leak and communicates this information to the central station 10, which decides if a leak is present and alerts the operator, if needed.

According to the invention, the remote units are placed as far apart as possible to minimize system cost and maintenance. This distance between the units ensures that if a leak occurs anywhere along the pipe, at least one unit detects its acoustic emission, and the projected detection error (failed detection and false alarm) is below a desired value. By knowing which unit detected the leak and the prominence of the leak, the central station is able to approximately determine the location of that leak. The unit separation is determined by the strength of the leak signal and acoustic transmission characteristics of the pipeline. The distance between the units determines the reliability of the system and the minimum size of the leak the system is able to detect.

It has been found that both the leak acoustic signature and pipeline acoustic characteristics greatly depend on the dimensions of the pipeline. The transmission characteristics also depend on the type of soil within which the pipeline is buried. Because pipeline dimensions and soil characteristic vary from site to site, a system "trained" for particular conditions is not transportable from one pipeline to another. However, with proper training or set-up the system can be adapted to any gas carrying pipeline.

Figure 2:
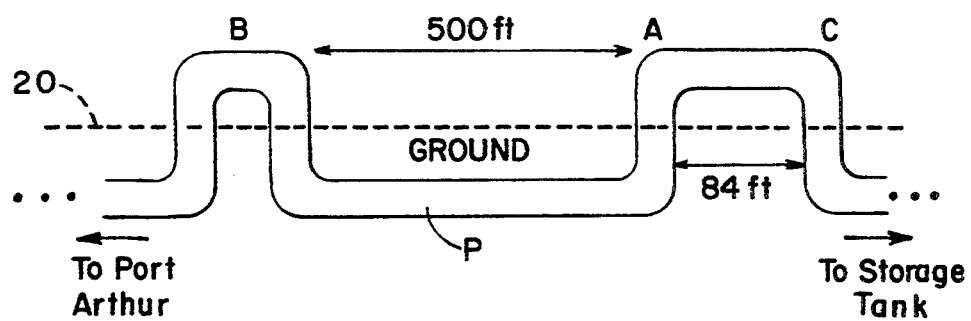
FIG. 2 is a schematic side view of an actual pipeline used to investigate and practice the present invention.

The pipeline used to test and practice the present invention is a Texaco ethylene carrying pipeline, running from a storage facility in Sour Lake, Tex. to chemical plants in Port Arthur, Tex. This approximately 40 mile long pipeline has an internal diameter of 6 inches and 1 inch thick walls. The pipeline carries ethylene gas with an internal pressure of 1500 psi and is buried in soil that is usually wet. As will be seen, the dampness of the soil greatly affected the pipeline propagation characteristics. FIG. 2 illustrates the pipeline P. Certain portions of the pipeline, e.g. at B, A and C, are above the ground level 20.

Finding the acoustic propagation characteristics of the pipeline involves the measurement of attenuation and phase shift of a reference signal on the actual pipeline. A model was developed to describe the acoustic behavior of the pipe, and model parameters were fitted to the propagation data that was collected.

Leak signal measurements were accomplished by building a leak simulator, using a piece of the actual pipeline. The simulator was filled with nitrogen gas to the pressure in the actual pipeline—1500 psi. Six leak modules were developed to simulate the various shapes and sizes of different leaks. Once the simulator was filled to the correct pressure, a valve was opened, letting the gas escape through one of the leak modules, and the resulting acoustic signal was measured. This setup gave a good sample of possible leak signals that can occur in the real pipe. It was found that the acoustic signature of the leak depends greatly on the shape of the leak and less on its size. For example, round leaks of different sizes produces different leak sound energies, but generated similar features which were different from the features generated by narrow slit leaks.

The hole shapes that can generally be encountered in a pipe are round holes, wide slits and narrow slits. Six different leak modules containing these hole shapes were constructed to collect data for use in identifying acoustic features of leaks in the pipe. The general leak collection strategy involved filling the simulator with nitrogen gas from a high pressure tank to the real pressure in the live pipe, opening a valve to release the gas through one of the installed leak modules, and measuring the resulting acoustic signal.

Figure 3:
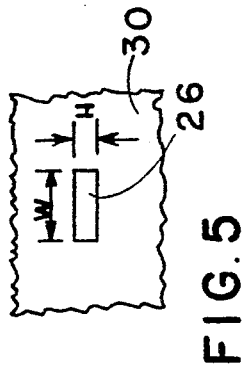
FIG. 3 is a sectional view through a section of simulated pipeline wall showing an aperture used to simulate a pipeline leak.

FIG. 3 illustrates one hole shape for the simulated pipeline wall thickness 30 of one inch, the hole 22 being conical with a small inside diameter of 1/32 inches and a large outside diameter of ¼ inches, the leakage flow being in the direction of the arrow.

Figure 4:
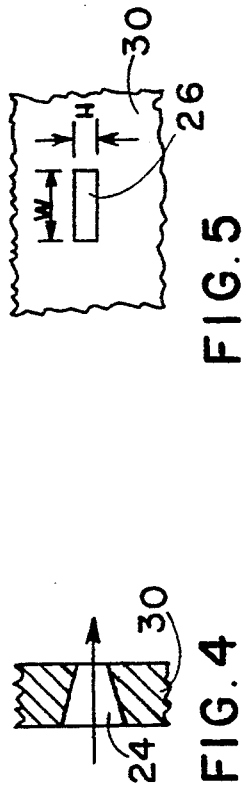
FIG. 4 is a view similar to FIG. 3 showing another shape for simulating the leak.
Figure 5:
FIG. 5 is a partial front elevational view of another shape for simulating a pipeline leak.

FIG. 4 shows a second conical hole 24 in the simulated wall thickness 30 of one inch, with an inner circular diameter of ¼ inches and an outer circular diameter of 1/32 inches. A cylindrical hole through the wall thickness was also utilized, this hole having a 1/16 inch diameter. Three different slot sizes were also utilized to simulate leaks, as represented in FIG. 5. The smallest slot shaped hole 26 in wall 30 had a height H of 1/32 inches and a width W of ¼ inches. The second tested slot had a height H of 1/16 inches and the third slot had a height H of ⅛ inches, both wider slots having width W of ¼ inches.

The McMaster reference identified above, suggested that the maximum frequency generated by a leak signal is about 100 KHz; thus, the sampling equipment used for the invention, had a sampling frequency of 204.8 KHz. The transducer was coupled to the leak simulator with lithium grease. It was found that most of the leak signal energy was located at frequencies below 40 KHz. According to the invention, minimum sampling frequency could be 150 to 250 KHz but rates of at least 50 to 60 KHz are adequate.

The acoustic signals of all six hole shapes were collected starting from gas pressure of 1500 psi, the real pressure in the pipe, down to 250 psi. One of the reasons for collecting signals at decreasing pressures was to examine the leak signal change with changing pressure.

The leaks generate a hissing sound, much like the sound generated when a seltzer bottle is first opened. The sound is generated due to the turbulent flow of the gas resulting from the pressure differential between the vessel and the environment and is a "white noise" signal. The frequency range of the sound depends on the dimensions of the pipe, the shape of the hole that the gas escapes through, and the pressure in the vessel.

An acoustic leak signal can be thought of as a random signal with some statistical properties. The first property, true of many pure analog signals, is that the leak signal has zero mean.

Because the gas carrying pipeline, pressure and leak shape remain relatively constant, the nature of the leak signal does not change, and statistical stationarity can be assumed. Wide sense stationarity can be shown through comparison of the short time autocorrelation function taken at different times. For zero mean random signals the autocovariance and autocorrelation functions are the same:

$$R_x[k,l] = \epsilon\{x[k]x^*[l]\} \tag{1}$$

which for ergotic processes can be approximated by:

$$R_x[k,l] = \frac{1}{N+1} \sum_{i=0}^{N-k} x[i+k]x^*[l] \tag{2}$$

for a large N. If a short enough frame of data is taken from a non-stationary signal, this frame can be assumed stationary and its autocorrelation function will only depend on the difference between the two indices:

$$R_x[k] = \frac{1}{N+1} \sum_{i=0}^{N-k-1} x[i]x^*[i+k] \tag{3}$$

Figure 6:
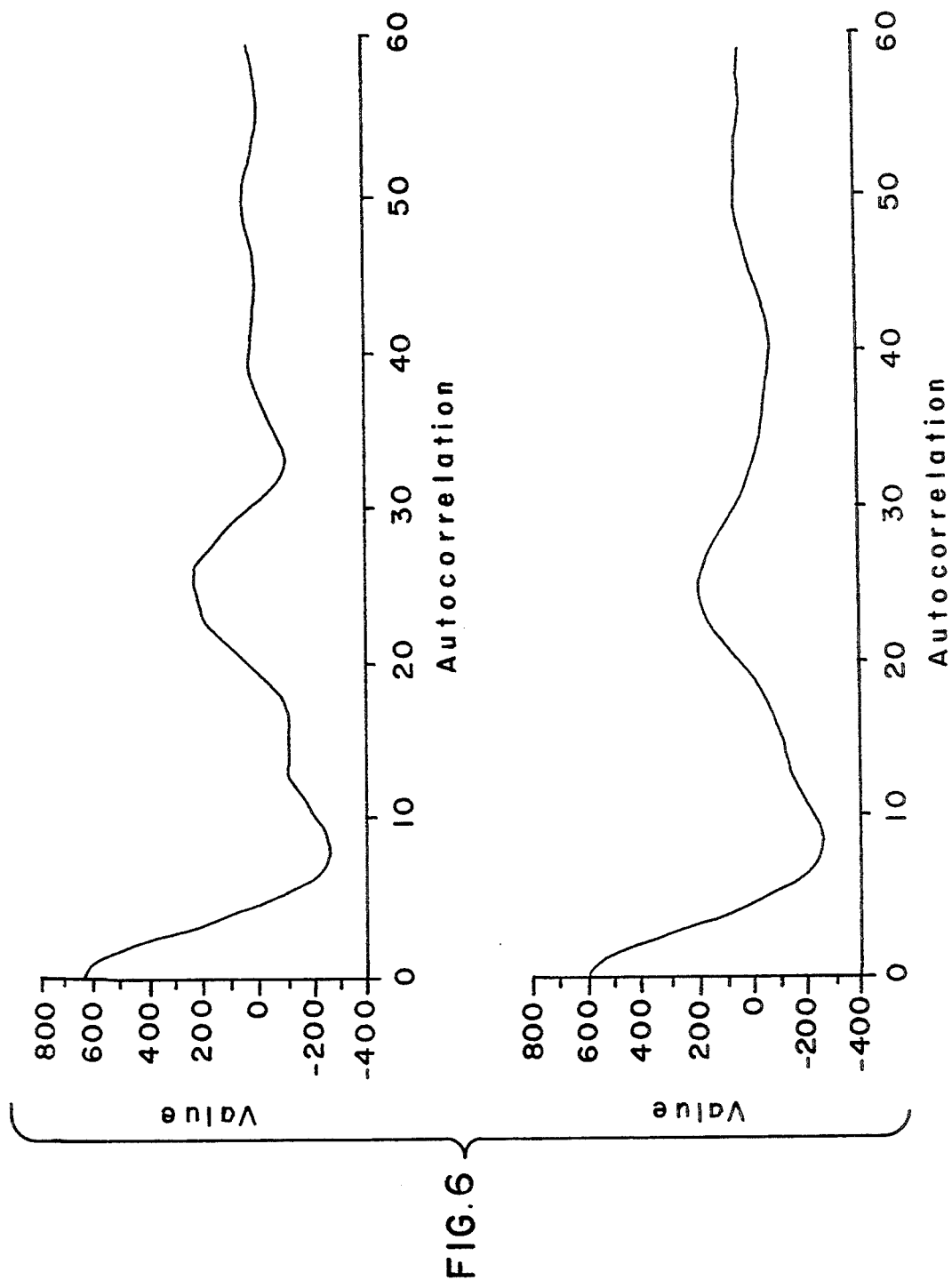
FIG. 6 is a composite pair of graphs plotting autocorrelation against value for short bursts of audio signal from a leak, taken at separate times.

For a finite data length of N, the above function is called the "short-time autocorrelation function". FIG. 6 shows the short time autocorrelation function of a leak signal for data windows taken at different times. The similarity in both means that the leak signal is at least wide-sense stationary.

Figure 7:
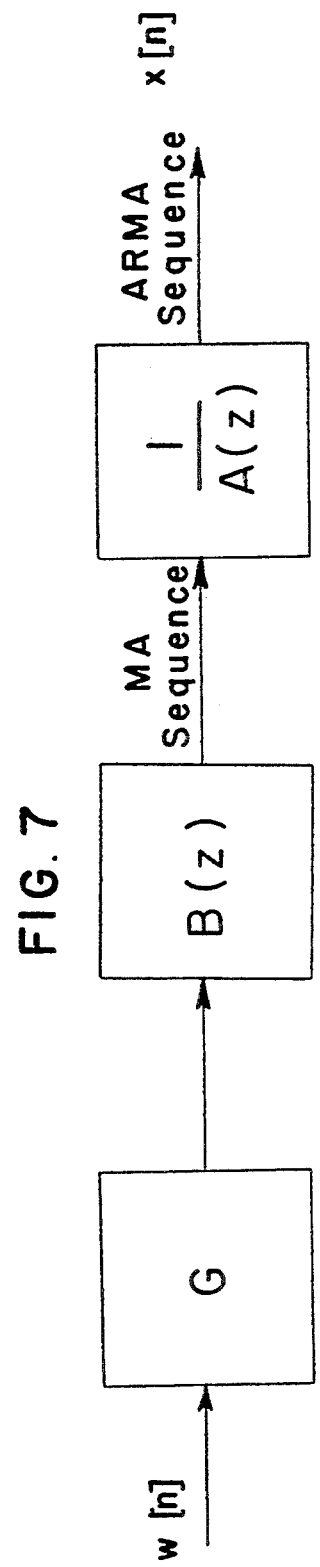
FIG. 7 is a block diagram illustrating the overall pattern recognition technique utilized by the present invention.

A widely used class of models for spectral estimation is a rational pole-zero filter driven by a white noise process. This type of model is called the autoregressive-moving average (ARMA) process model. A block diagram of this model as used in the present invention, is shown in FIG. 7. In this model w[n] is the zero mean and unit variance white leak noise sequence and G is the gain of the ARMA filter. The ARMA rational pole-zero spectral shaping filter for the invention is divided into two separate functions B(z) and 1/A(z). G can also be thought of as the driving white noise variance, B(z)/A(z) corresponds to the spectral shaping component of the sound, w[n] is the turbulence signal, and G depends on the pressure differential between the substance in the pipe and the environment.

The motivation of parametric models of random processes is the ability to produce simulated random signals without the need for large-scale data collection. Another advantage specific to this invention is the separation of the filter gain from the filter. This separation cannot be achieved through non-parametric techniques and its importance will be evident later.

The filter:

$$B(z) = 1 + \sum_{k=1}^{q} b[k] z^{-k} \tag{4}$$

and $$A(z) = 1 + \sum_{k=1}^{p} a[k] z^{-k} \tag{5}$$

with B(z) being the moving average (MA) polynomial, A(z) the autoregressive (AR) polynomial, q the number of zeros, p the number of poles, and b[k] the filter coefficients. The process sample x[n] can, then, be estimated from the filter linear difference equation:

$$x[n] = -\sum_{k=1}^{p} a[k]x[n-k] + G\sum_{k=0}^{q} b[k]w[n-k] \quad (6)$$

with b[0]=1. The model estimation problem involves the estimation of b[k], a[k] and G parameters.

A reduction in computational complexity can be achieved if ARMA parameters estimation is accomplished through a separate estimation of the AR and MA coefficients. If the autocorrelation sequence is known then the AR coefficients are related through a set of p linear equations to the autocorrelation sequence for lags greater then q:

$$\begin{pmatrix} R_X[q] & R_X[q-1] & \cdots & R_X[q-p+1] \\ R_X[q+1] & R_X[q] & \cdots & R_X[q-p+2] \\ \vdots & \vdots & & \vdots \\ R_X[q+p-1] & R_X[q+p-2] & \cdots & R_X[q] \end{pmatrix} \begin{pmatrix} a[1] \\ a[2] \\ \vdots \\ a[p] \end{pmatrix} = - \begin{pmatrix} R_X[q+1] \\ R_X[q+2] \\ \vdots \\ R_X[q+p] \end{pmatrix}$$

Simultaneous equations (7) are called the modified Yule-Walker equations.

In practice, the autocorrelation sequence has to be estimated from the data sequence through equation (3). This same data can now be passed through the inverse AR filter to get the MA sequence, which can be used to estimate the MA coefficients.

Solving for the MA coefficients is not as simple as the solution for AR coefficients.

Both MA and ARMA parameter are equal to the infinite AR sequence and thus, MA parameter can be approximated from a long AR sequence. See S. Marple, *Digital Spectral Analysis with Applications*, Prentice-Hall, 1987. Because we are only interested in the PSD estimation from the ARMA parameters, a long AR sequence need not be transformed to an ARMA sequence, but the PSD can be directly computed from this AR sequence for the present invention.

The approximation of both G and A(z) can be easily achieved due to the duality of the AR coefficients and the linear predictive coding (LPC's) coefficients. LPC analysis involves the prediction of the current sample of the random signal from previous samples.

Since computation in this way is impossible without knowledge of join statistics of x[n] given all past x values, LPC analysis for the present invention assumes a finite linear relation between x[n] and p past x parameters:

$$\hat{x}[n] = -\sum_{k=1}^{p} a[k]x[n-k] \quad (8)$$

The estimation of LPC coefficients involves the minimization of the prediction error:

$$e[n] = x[n] - \hat{x}[n] \quad (9)$$

so that $$x[n] = -\sum_{k=1}^{p} a[k]x[n-k] + e[n] \quad (10)$$

If this minimization is accomplished in the mean-squared error sense, it involves minimizing the error variance:

$$\rho = \epsilon\{|e[n]|^2\} \quad (11)$$

Minimization of p involves the solution of p linear equations.

$$\begin{pmatrix} R_X[0] & R_X[1] & \cdots & R_X[p-1] \\ R_X[1] & R_X[0] & \cdots & R_X[p-2] \\ \vdots & \vdots & & \vdots \\ R_X[p-1] & R_X[p-2] & \cdots & R_X[0] \end{pmatrix} \begin{pmatrix} a[1] \\ a[2] \\ \vdots \\ a[p] \end{pmatrix} = - \begin{pmatrix} R_X[1] \\ R_X[2] \\ \vdots \\ R_X[p] \end{pmatrix} \quad (12)$$

The analogy to the AR coefficients can bee seen by comparing (12) to (7) while setting q=0 and remembering that $R_x[m]=R_x[-m]$ for stationary sequences. Thus, the LPC coefficients calculated by solving equation (12) will be equivalent to the AR coefficients of the same order. Comparing equation (10) to equation (6) with q=0, it is clear that e[n]=w[n] and G=p. Thus, the error variance resulting from the solution of (12) will be the approximation of G, the gain of the AR filter.

The advantage of (12) is the fact that the autocorrelation matrix in this equation is Toeplitz and that the column vector on the right hand side has the same elements as the autocorrelation matrix. An efficient recursive algorithm can be used to solve (12). See J. Makhoul, "Linear prediction: A tutorial review", *Proc. IEEE*, pp. 561–580, April 1975. This algorithm is called the Levinson-Durbin recursive procedure and is summarized below:

$$E_0 = R_X[0] \quad (13)$$

$$k_i = - \frac{R_X[i] + \sum_{j=1}^{i-1} a_j^{(i-1)} R_X[i-j]}{E_{i-1}}$$

-continued $$a_i^{(i)} = k_i$$

$$a_j^{(i)} = a_j^{(i-1)} + k_i a_{i-j}^{(i-1)} \quad 1 \leq j \leq i - 1$$

$$E_i = (1 - k_i^2) E_{i-1}$$

The above recursion is calculated for i=1, 2 . . . , p and the final solution is given by:

$$a_j = a_j^{(p)} \quad 1 \leq j \leq p$$

$$\rho = E_p/N \tag{14}$$

where N is the length of the data segment from which the autocorrelation sequence was calculated. The next question is how large should p be for good process estimation. The order can be estimated directly from the data. There are numerous order estimation algorithms available in literature. The algorithm chosen here for its simplicity and good results for large data windows is the Minimum Description Length (MDL) algorithm presented by Rissanen, in *Ann. of Statistics*, pp. 416,431, 1983. The algorithm chooses the order which minimizes the function:

$$MDL(p) = N \ln E_p + p \ln N \tag{15}$$

Feature selection is the most important part in any pattern recognition problem. Features should be selected in such a way as to maximally separate the cases between which discrimination is desired.

When it comes to signal classification, frequency domain analysis is predominantly used. The PSD of the signal, or features related to it, is the most useful signal characterization in the frequency domain. It is important to remember that frequency domain representation of signals considers second order statistics only while higher order statistics are ignored.

In the inventive system the leak can occur at any distance from the receiver so that no matter what acoustic intensity the leak generates, the acoustic energy will be attenuated exponentially by the pipe. Thus, bigger leaks might represent the same acoustic intensity at the receiver as smaller leaks located closer to that receiver. The intensity of the source will, thus, be unknown at the receiver and the acoustic energy of the received signal should not come into play in the feature vector.

Figure 8:
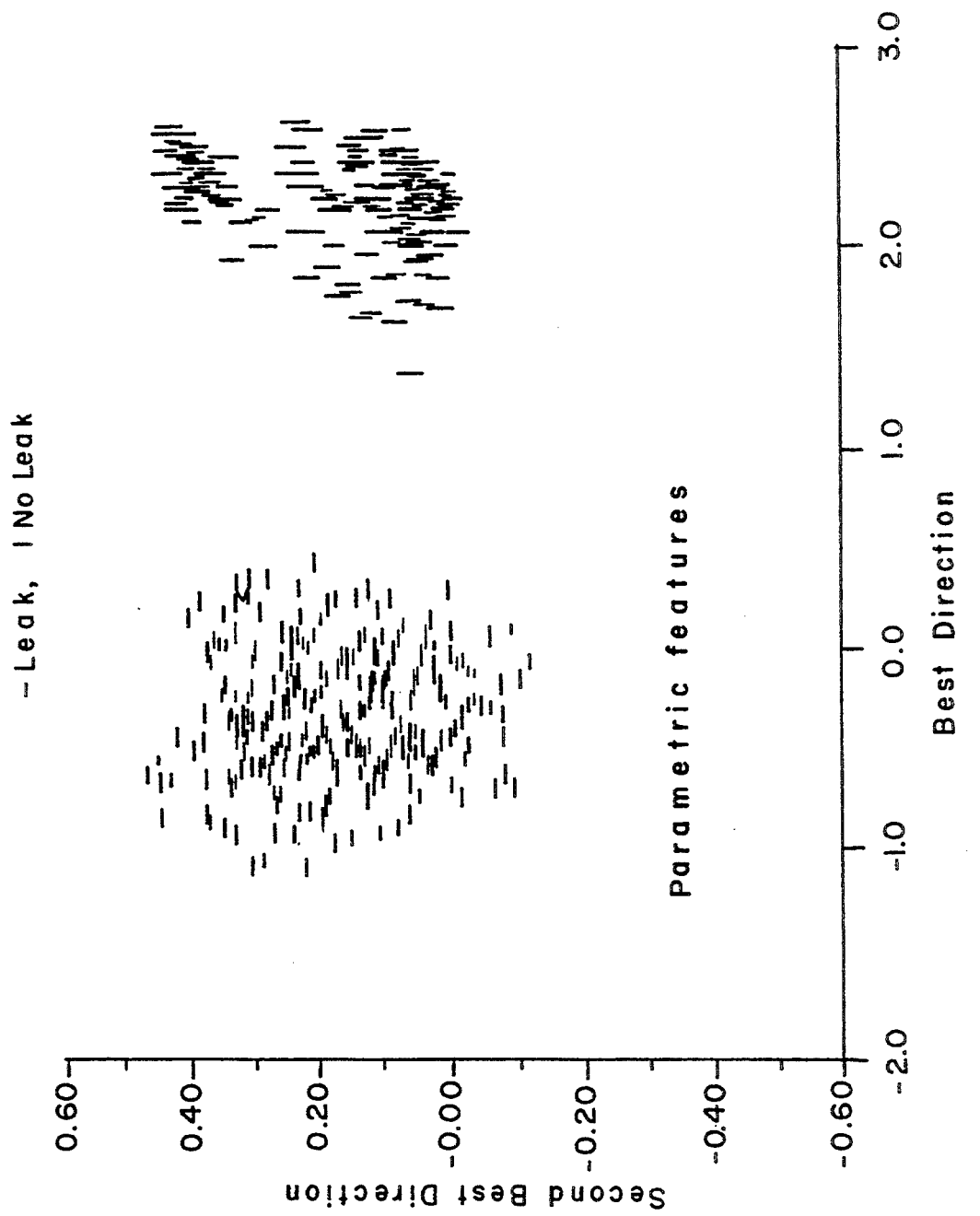
FIG. 8 is a scatter plot for leak signals used with parametric features.
Figure 9:
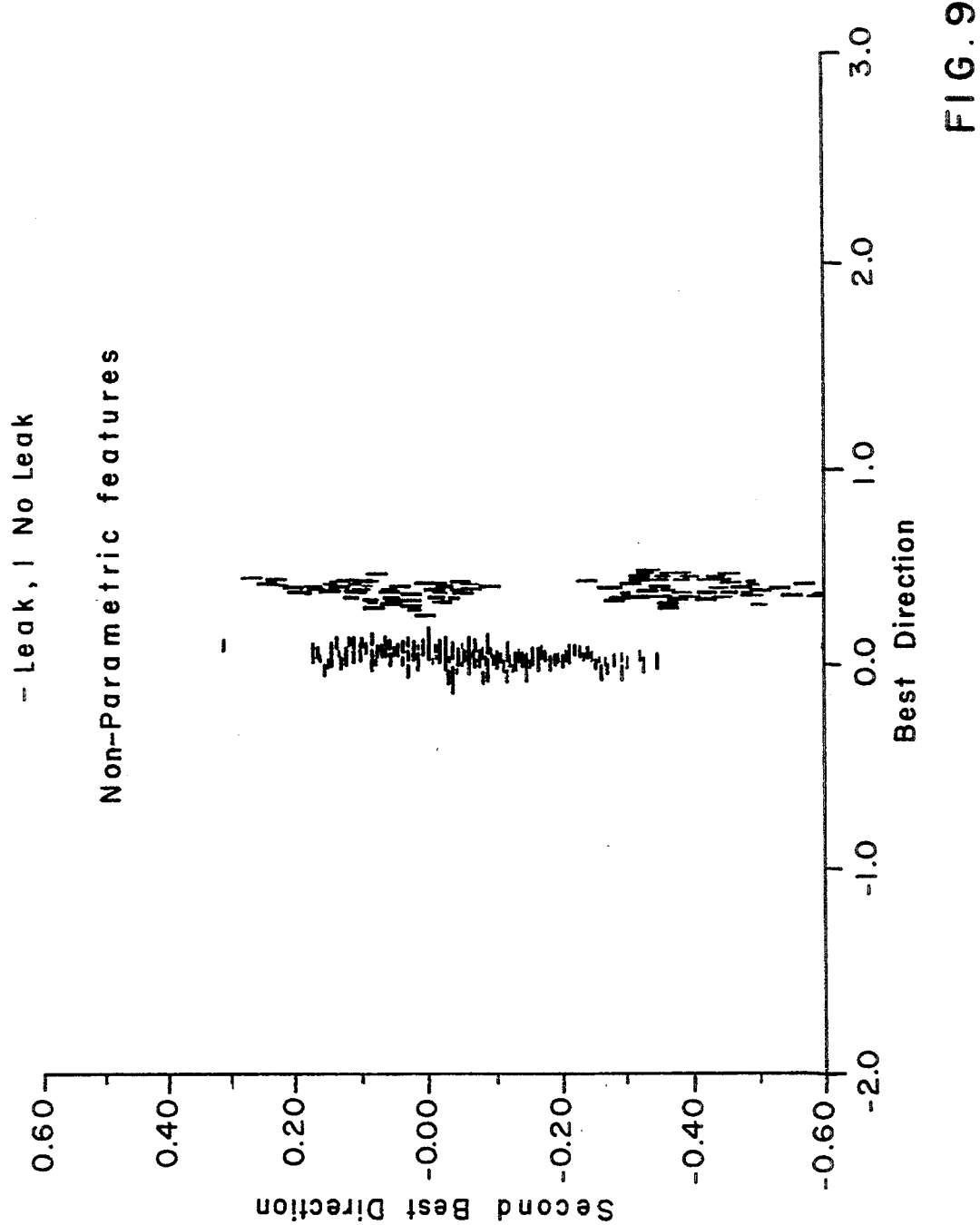
FIG. 9 is graph similar to FIG. 8 for non-parametric features.

The PSD can be calculated using both non-parametric and parametric techniques. Both techniques were tried for this invention. The features were tested by trying to cluster the leak signals from different modules. It was found that the features extracted from the parametric techniques and similar features extracted from the non-parametric techniques produced very similar clustering results. See FIGS. 8 and 9. However, the parametric features worked much better when differentiating between leak and non-leak clusters.

To test how well a certain set of features represented leaks, the given set of features was used to separate the leak signals generated by the six leak modules.

In order to extract the features from the leak signals, the data was separated into frames of 256 samples each. The equipment used to collect and separate that data will be described later. Such data separation amounts to multiplying the signal by a square window, or convolving the signal frequency response with a sinc wave. This type of convolution distorts the frequency features of the signal due to high side lobes of the sinc wave. It is desired to change the window so that in the frequency domain this window resembles an impulse or at least has fast decay of the side lobes. A window that provides both good results and speed of computation is the Hamming window:

$$w[n] = \begin{cases} 0.54 - 0.46 * \cos[2\pi n/(N-1)] & 0 \leq n \leq N-1 \\ 0 & \text{otherwise} \end{cases} \tag{16}$$

The Hamming window length of N=256 was used on the data before any other processing. Both parametric and non-parametric features were extracted from the windowed data and tested.

AR parameters were extracted using the Levinson-Durbin recursive procedure, (13). This procedure automatically separates the energy of the signal, e.g., the gain of the filter, G, from the filter parameters so no energy normalization was required prior or after feature extraction. The normalization was performed by simple ignoring G. Because the AR coefficients represent the coefficients of a stable filter, they cannot be used directly as features. Their mean, for instance, might not even represent a stable filter, let alone produce an "average" frequency response. In fact, two feature vectors made up of AR coefficients might be "close" in the Euclidean distance sense, but might represent completely different frequency responses. This is the same as saying that AR coefficients do not cluster well in Euclidean space.

Instead of using the AR coefficients as features, features extracted from these AR coefficients can be used. One such set of features are the "cepstrum" coefficients extracted from the AR coefficients. Cepstrum analysis is often used for homomorphic signal decomposition when deconvolution of two signals is required. The cepstrums, however, also cluster well in Euclidean space and can be used as features in this case. Another advantage is that there is an efficient technique to generate a variation of the cepstrum called the LPC cepstrum from the AR coefficients directly:

$$h[n] = a[n] + \sum_{k=1}^{n-1} \left(\frac{k}{n}\right) h[k] a[n - k] \tag{17}$$

The above relation is solved for the LPC cepstrums, h[n], recursively, n=1,2 . . . with a[n] being the AR coefficients for n=0,1,2 . . . , p and zero otherwise. See D. O'Shanghnessy, *Speech Communication: Human and Machine*, Addison-Wesley, 1987.

Figure 10:
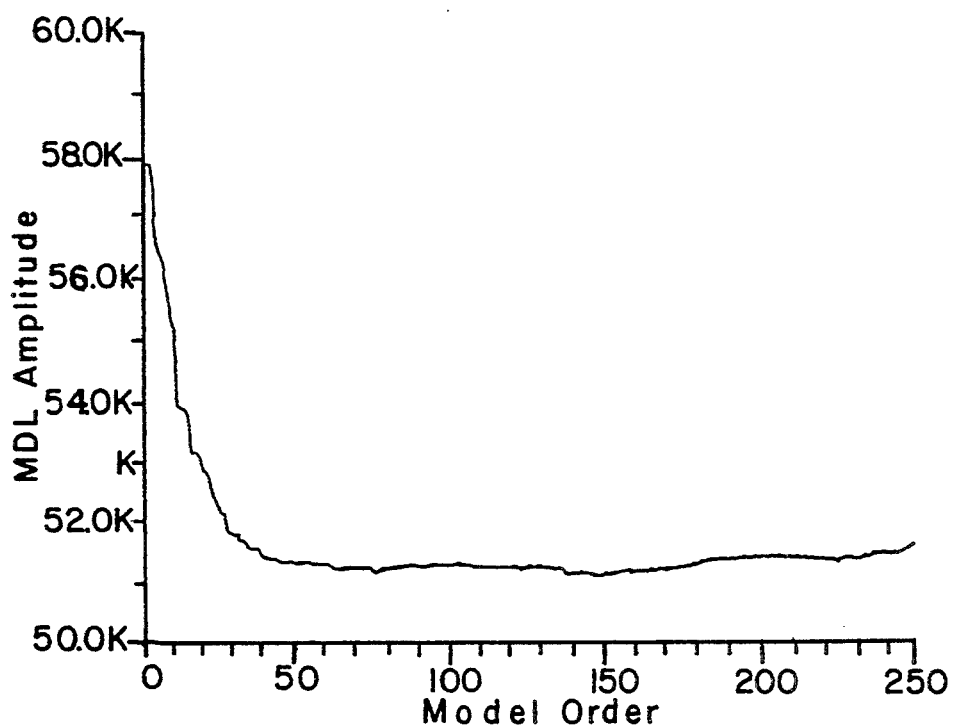
FIG. 10 is a graph illustrating a typical MDL function for recognizing an audio leak signal.
Figure 11:
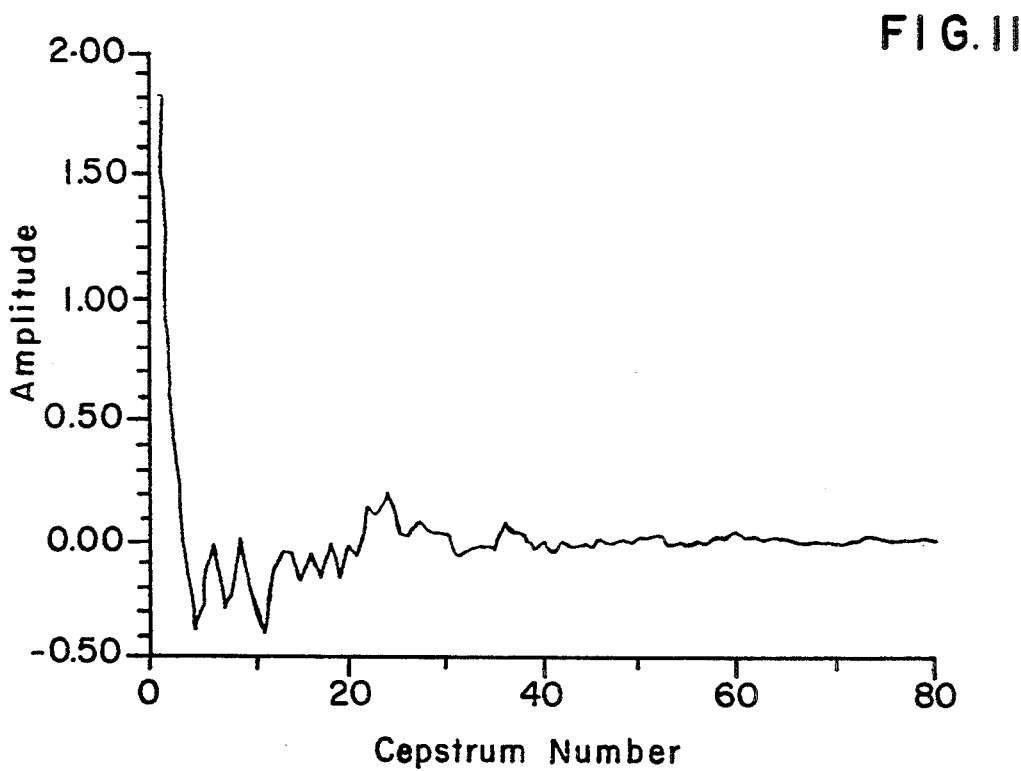
FIG. 11 is a graph illustrating a typical LPC cepstrum characteristic used successfully to recognize the leaks according to the present invention.

The order of the AR coefficients can be determined using the MDL equation (15). The plot of a typical MDL function is shown in FIG. 10.

It is desirable to choose the smallest model order possible to minimize computation time. It is also impossible to choose a very large model order when the data window size is small because of the error in the estimation of the autocorrelation function for large lags. Although the MDL function is minimized around the order 60–80, it does not decrease much after the order of 30. This order was selected for analysis.

Typical LPC cepstral coefficients extracted from a leak signal, using model order of 30, are plotted in FIG.

11. Because most of the energy is contained in the first fifty coefficients, a cepstral order of 50 was used.

A DFT was used as an approximation of the PSD of the signal. In order to compare the performance of non-parametric features to the parametric ones, similar parameters for both were extracted. Thus, as LPC cepstrums were used as parameters for the parametric features, the real cepstrums were used for the non-parametric ones.

The real cepstrum is calculated from S[k] by taking the inverse DFT of the log of $|S[k]|$:

$$h[n] = \frac{1}{N} \sum_{k=0}^{N-1} \log|S[k]| e^{j(2\pi/N)kn} \quad (18)$$

See, L. B. Jackson, *Digital Filters and Signal Processing*, Kluwer Academic Publishers, 2nd Ed. 1984. Note that while the LPC cepstrum is an infinite sequence, the real cepstrum is a finite sequence of length N. For a frame length of 256, N, of course, also equals 256. However, as with the LPC cepstrums, the energy of the real cepstrums is concentrated in the low coefficients. In order to keep differences between the parametric features and the non-parametric features to a minimum, order of 50 was chosen for the non-parametric features.

Because the DFT and the cepstrums include signal energy information, every data frame was energy normalized to 1 before the analysis. First, the energy of the frame was found:

$$E = \sum_{i=0}^{N-1} x[i]^2 \quad (19)$$

Then, every sample was divided by the square root of the energy:

$$x'[i] = \frac{x[i]}{\sqrt{E}} \text{ for } i = 0, 1, 2, \ldots, N-1 \quad (20)$$

Before processing, the Hamming window (16) of the length 256 was applied to $x'[n]$. Cepstrums were then extracted and used as features.

When selected features, it is important to estimate their effectiveness with respect to class separability. It is advantageous to calculate some sort of a meaningful distance between classes, given a set of feature vectors from each class.

In this project, there are two classes of interest, the leak class and the non-leak class. When a signal is received and the feature vector X is extracted, the detection problem can be separated into two hypotheses:

$H_0$: X represents a non-leak signal $H_1$: X represents a leak signal  (21)

A number of tests exist to test a hypothesis, given the feature vector, and come up with a decision. The two most widely used criteria for testing are the Bayes and Neyman-Pearson criteria. See, H. L. VanTrees, *Detection, Estimation and Modulation Theory, Part I*, Wiley, 1968.

The Bayes criterion tries to minimize the cost of making a decision. Each time a decision is made, one of four things can happen:

1. $H_0$ is true; $H_0$ chosen. Cost is $C_{00}$.
2. $H_0$ is true; $H_1$ chosen. Cost is $C_{10}$.
3. $H_1$ is true; $H_0$ chosen. Cost is $C_{01}$.
4. $H_1$ is true; $H_1$ chosen. Cost is $C_{11}$.

Setting the probability of a leak signal to $P_0$ and the probability of a non-leak signal to $P_1$, the value of the total cost is:

$$C = C_{00}P_0 p(\text{say } H_0|H_0 \text{ is true}) \quad (22)$$
$$C_{10}P_0 p(\text{say } H_1|H_0 \text{ is true})$$
$$C_{11}P_1 p(\text{say } H_1|H_1 \text{ is true})$$
$$C_{01}P_1 p(\text{say } H_0|H_1 \text{ is true})$$

The cost is minimized if the decision is taken according to the likelihood ratio:

$$\Lambda(X) = \frac{p_{x|H_1}(X|H_1)}{p_{x|H_0}(X|H_0)} \overset{H_1}{\underset{H_0}{\gtrless}} \frac{P_0(C_{10} - C_{00})}{P_1(C_{01} - C_{11})} \quad (23)$$

That is, choose hypothesis 1 if $\Lambda(X)$ is greater than the right hand side, otherwise choose hypothesis 0. The right hand side is called the threshold of the likelihood ratio.

If we set $C_{00}=C_{11}=0$ and $C_{01}=C_{10}=1$, the likelihood ration (23) will give a decision that minimizes the error. This situation is currently of greatest interest, but might change later depending on the cost of missing a leak when it is there (miss) as opposed to the cost of announcing a leak that is not there (false alarm).

This brings us to the Neyman-Pearson criterion. This criterion chooses the threshold of the likelihood ratio in such a way as to optimize some parameter given another. For instance, if the maximum probability of a miss that can be tolerated is $P_M$, the Neyman-Pearson criterion will find the threshold of the likelihood function that gives the minimum probability of false alarm. This criterion will be used later in the project when tolerable probabilities of miss or false alarm will be estimated.

When we operate under the minimum error constraint, the Bayes error can be calculated using:

$$\text{Error} = P_0 \int_{Z_1} p_{x|H_0}(X|H_0)dX + P_1 \int_{Z_0} p_{x|H_1}(X|H_1)dX \quad (24)$$

where $Z_1$ is the region where hypothesis 1 is chosen and $Z_0$ is the region where hypothesis 0 is chosen. The exact calculation of the error rate using the above formula is difficult and requires numerical techniques even when the probability distributions are normal. See K. Fukunaga, *Introduction to Statistical Pattern Recognition*, 2nd Ed., Academic Press, 1990. It is possible, however, to develop an upper bound to the error or any other performance criterion is the Chernoff bound. This bound provides a close upper bound for probability of false alarm $P_f$ and probability of a miss $P_M$:

$$P_F \leq \exp[\mu(s) - s\mu(s)] \ 0 \leq s \leq 1 \quad (25)$$
$$P_M \leq \exp[\mu(s) + (1-s)\mu(s)]$$

where:

$$\mu(s) = \ln \int_{-\infty}^{\infty} [p_{x|H_1}(X|H_1)]^s [p_{x|H_0}(X|H_0)]^{1-s} dX \quad (26)$$

When the threshold minimized the Bayes error, the Chernoff bound reduces to:

$$Pr(\text{Error}) \leq \sqrt{P_0 P_1}\, e^{\mu(s)} \quad (27)$$

When the distribution for the two hypotheses are Gaussian and equiprobable, $\mu(s)$ becomes:

$$\mu(s) = -\frac{s(1-s)}{2}(M_1 - M_0)^T[s\Sigma_0 + (1-s)\Sigma_1]^{-1}(M_1 - M_0) + \frac{1}{2}\ln\frac{|s\Sigma_0 - (1-s)\Sigma_1|}{|\Sigma_1|^s|\Sigma_0|^{1-s}} \quad (28)$$

where $M_0$ is the mean class of 0, $M_1$ is the mean of class 1 and $\Sigma_i$ are the corresponding covariance matrixes. Because $\mu(s)$ is convey, the minimum upper bound in this case will be at a point $s_m$ at which $\mu(s_m)=0$, or when $\mu(s)$ is minimum. Optimum s can be found by plotting $\mu(s)$ and seeing at which s it will be minimum.

In this invention, only an approximate upper bound is needed, so a looser upper bound on the Bayes error, the Bhattacharyya bound, can be used. This bound sets $s=\frac{1}{2}$. The Bhattacharyya distance is defined as the negative of $\mu(\frac{1}{2})$ and from (28) is:

$$-\mu(1/2) = \frac{1}{8}(M_1 - M_0)^T\left[\frac{\Sigma_0 + \Sigma_1}{2}\right]^{-1}(M_1 - M_0) + \frac{1}{2}\ln\frac{\left|\frac{\Sigma_0 + \Sigma_1}{2}\right|}{\sqrt{|\Sigma_1||\Sigma_0|}} \quad (29)$$

The Bhattacharyya distance provides a measure on the separability of two distributions and together with formula (27) gives the upper bound on the Bayes error. This distance will be used to show that the parametric features work much better than the non-parametric ones when it comes to separating leak signals from non-leak signals.

Figure 12:
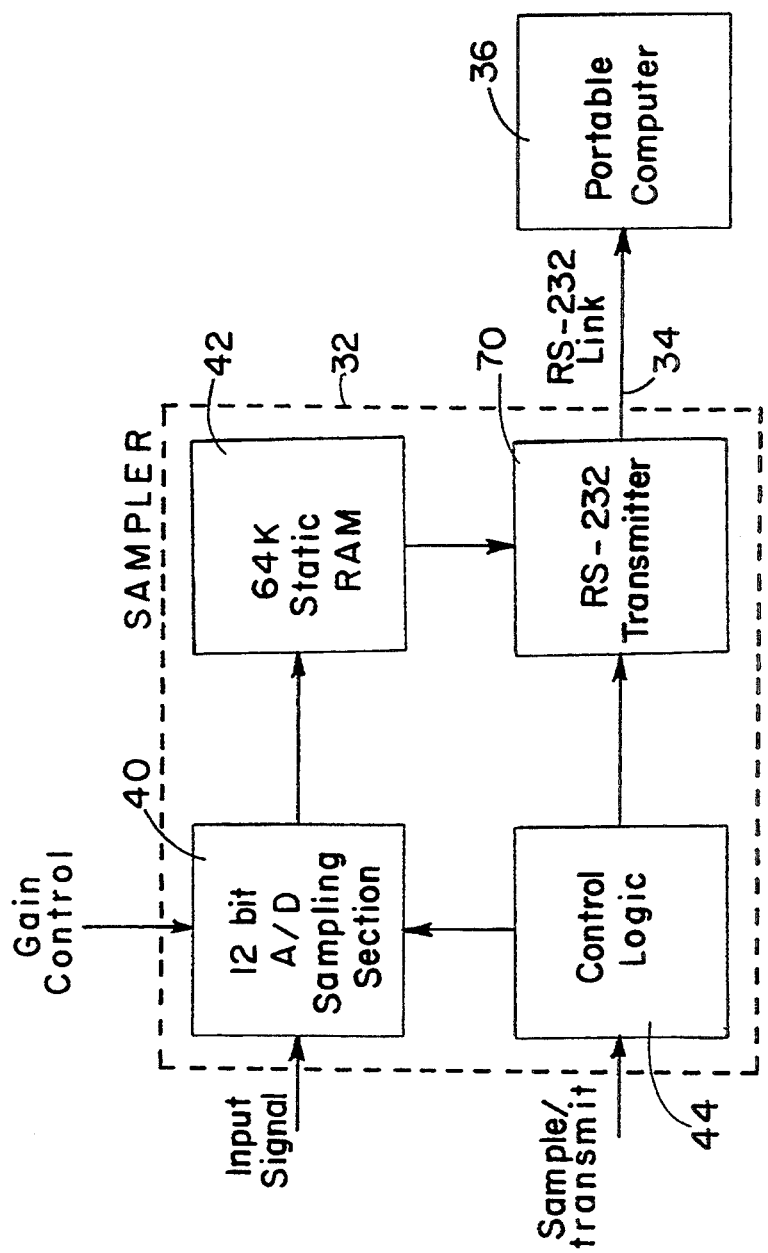
FIG. 12 is a block diagram of the data collection hardware used according to the present invention.

The hardware utilized to collect and analyze data for the present invention is illustrated in FIG. 12.

Acoustic propagation data which must be collected for pattern recognition, is collected in the field. Thus, the equipment should be portable and battery-powered. Fast A/D converter (at least 200 KHz sampling rate) is also needed for leak signals of up to 100 KHz.

FIG. 12 illustrates a sampler 32 of the invention with an RS-232 port 34 that is connected to a portable IBM-PC compatible computer 36 for storing the collected data. Both the data sampler, which can be used as sensor unit $T_1 \ldots T_N$, and the computer which can be used as the control station 10 in FIG. 1, operate on battery power. Because the RS-232 port cannot handle data speeds generated due to the sampling rate, the sampler was designed with a fast memory buffer 42 to store the collected data. The avoid unnecessary complications, the sampler was entirely controlled by digital logic at 44 instead of a microprocessor. This saved microprocessor programming and debugging phases when the invention was developed, but a microprocessor should be used in a commercial product that embodies the invention.

A 64K bytes memory subsystem forms buffer 42 which held sampled data. The sampling rate was set to 204.8 KHz and could be decreased by powers of 2 all the way down to 6.4 KHz. The acoustic signal entered an A/D converter 40 which has a 12-bit output data bus. In this way a total of 32768 samples could be collected at every data collection trial. At 204.8 KHz sampling rate, this amounted to a sampling window of 0.16 seconds.

Figure 13:
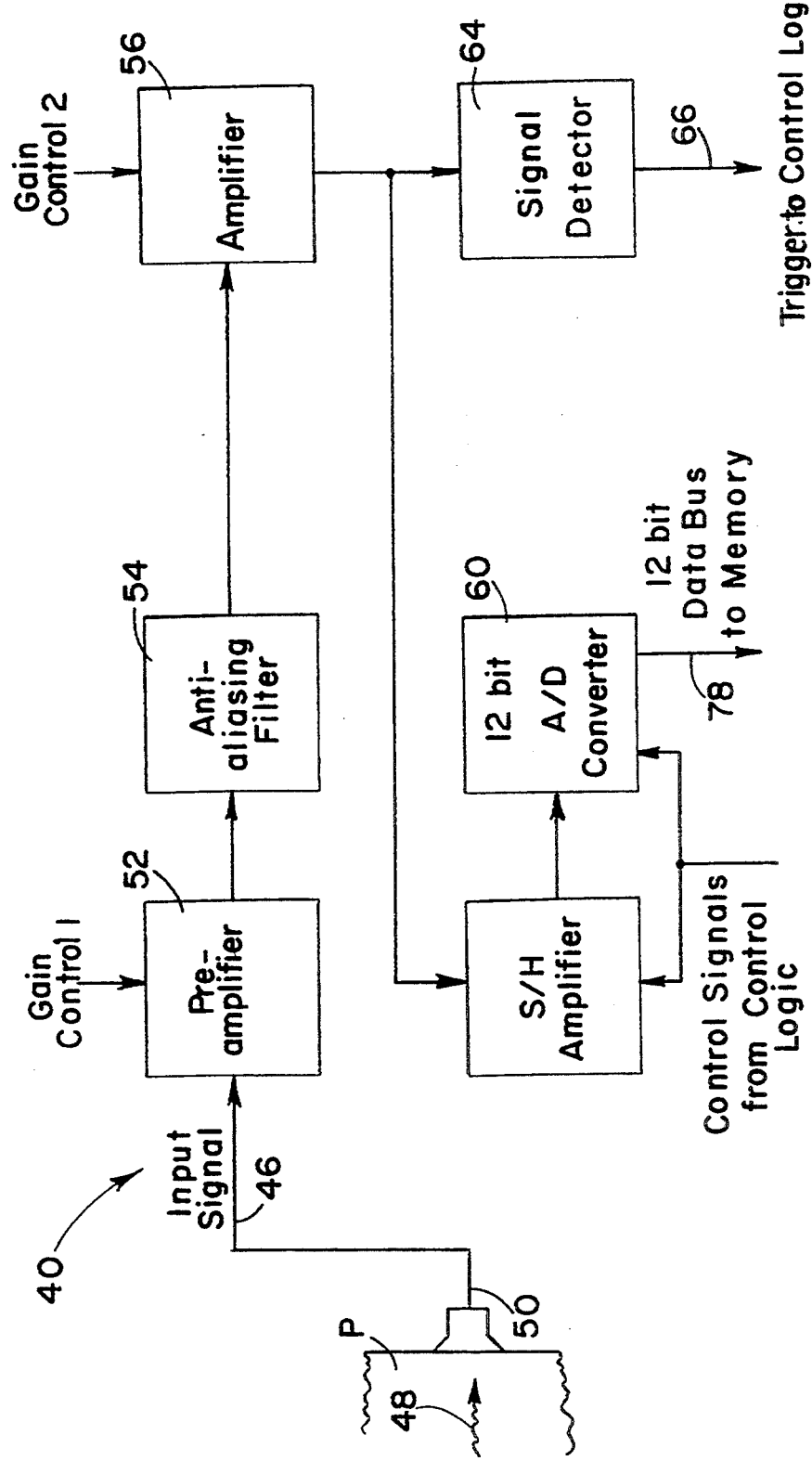
FIG. 13 is a block diagram of the A/D sampling section of the invention.

FIG. 13 illustrates the analog input section 40. The acoustic signal 48 is converted to an analog input 46 by a piezoelectric transducer 50 coupled to the pipe P. The transducer was connected to the pipe with heavy grease to provide good acoustic coupling.

The analog signal propagated through a pre-amplifier 52 with an external manual gain control. The gain control consisted of a switch that changed the feedback resistance of the amplifier. The switch had three positions that set the gain of the pre-amplifier 52 to 101, 51 or 2.

An anti-aliasing filter 54 in the form of an eighth-order Butterworth filter made of four Sallen-Key filter modules, had a cutoff frequency of 100 KHz and was connected to pre-amplifier 52.

An amplifier section 56 further increased the voltage of the input signal to the level acceptable by an A/D converter 60. Like the pre-amplifier, the amplifier 56 also had a gain control set by a three-position switch that modified the amplifier feedback resistance. The gain of the amplifier could be set to 26, 11 or 2. This amplifier, together with the pre-amplifier, provided nine-different gains for the whole system, which were, in increasing order: 4, 22, 52, 102, 202, 561, 1111, 1326 and 2626. The wide diversity of gains allowed sampling of both very strong, and very weak signals.

Both a sample-and-hold amplifier and the A/D converter 60 were single chip, integrated components. The sample-and-hold amplifier was an Analog Device HCT-0300A part, which contained a fast, inverted amplifier with a gain of 1 and had an acquisition time of 200 ns. The A/D converter was a MAXIM MAX162 part. This was a successive approximation, 12-bit, 3 $\mu$s converter that was chosen for both its speed and low power consumption. The A/D clock, Sample command and the sample-and-hold amplifier Hold command were supplied by the Control Logic section. The A/D provided the 12 data bits directly to the buffer memory.

During data collection, there was a need to sample short duration, impulse-like signals. Because of the short sampling window, it was impossible to start data collection manually and still capture these impulse signals. A signal detector module 64 provided a trigger 66 to the Control Logic 44 when the signal level passed a certain threshold value. If the Control Logic was set to start the conversation automatically, the data collection started on the first active trigger of the Signal Detector module, easily capturing impulse-like signals.

Figure 14:
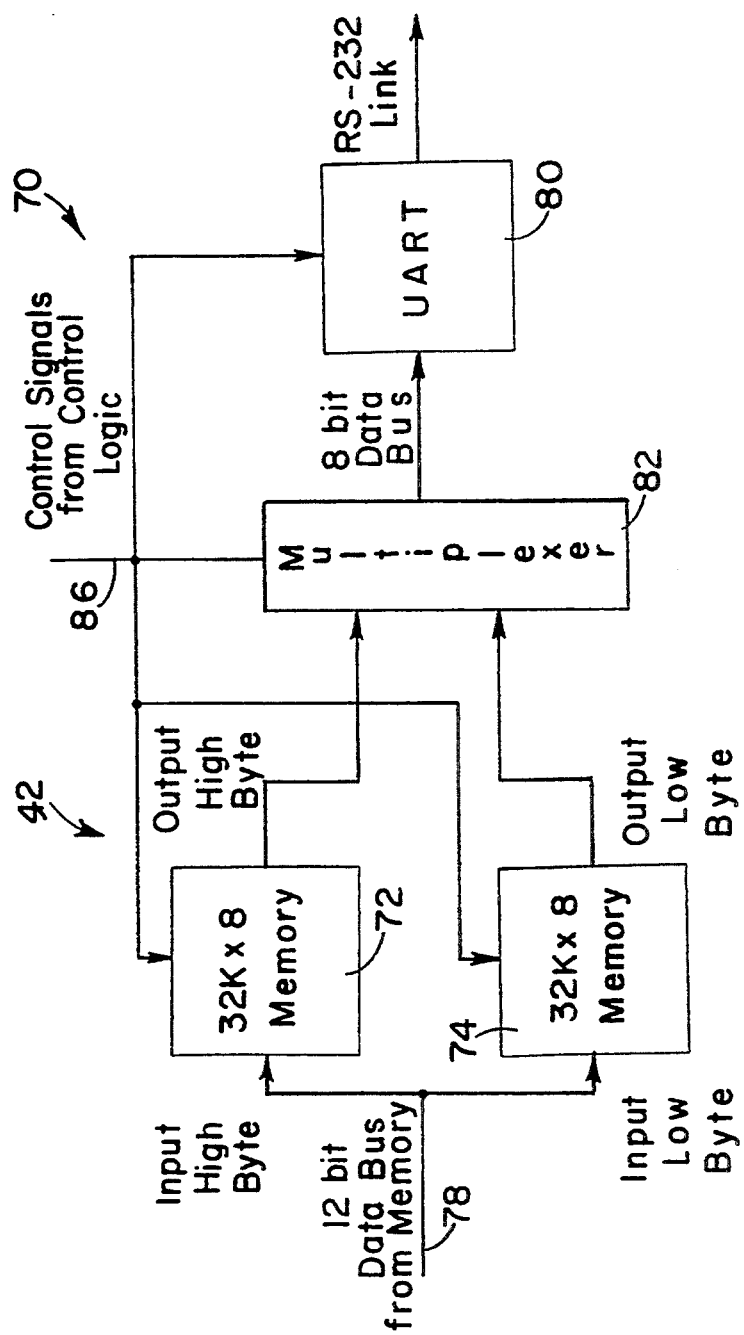
FIG. 14 is a block diagram of the memory and output section of the invention.

FIG. 14 illustrates the memory 42 and output sections 70. The memory components used were the NEC 32K bytes static memory chips 72, 74. Each chip had an eight-bit input/output data bus, which was configured either as an input during the Sample mode, or as an output during the Send mode (when the data was sent to the portable computer 36). The mode type and the control signals 86 were provided by the Control Logic section. When the system was in the Sample mode, the data was supplied directly to both memory chips through a 12-bit data bus 78 from the A/D converter 60. When the system was in the Send mode, data was supplied 8-bits at a time to a Universal Asynchronous Receiver/Transmitter (UART) 80 and the data bus was multiplexed at 82. Due to the design, the easiest way to send the data to the portable computer was to transmit all the low bytes first, followed by the high bytes. The communication program in the portable computer combined all the bytes correctly before storing them.

The UART 80 was a standard General Instruments AY-3-1015 D part. Its baud rate was adjustable from 150 to 19200 bits-per-second. The baud rate actually used was 9600 bits-per-second, which provided an approximate two-minute data transmission between the sampler and the computer.

Figure 15:
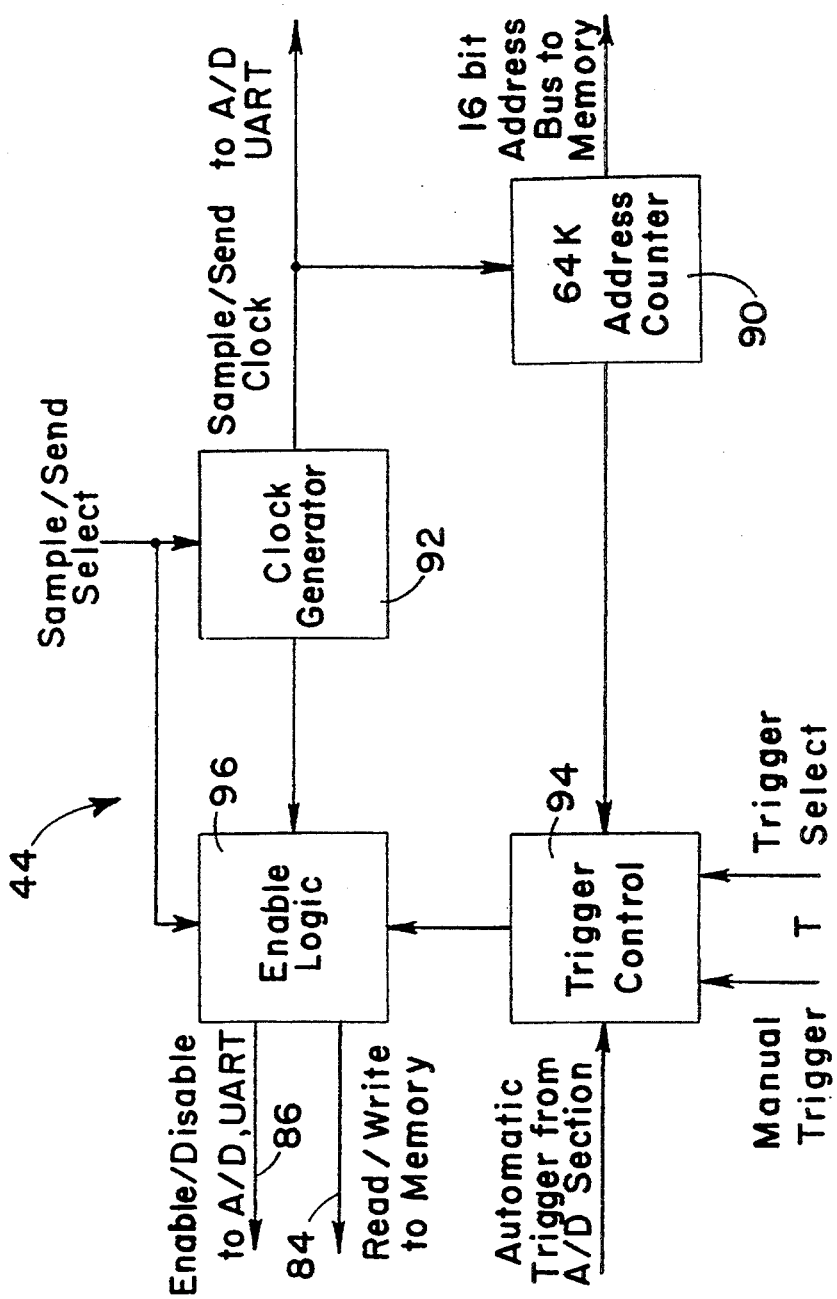
FIG. 15 is a graph plotting is a block diagram of the control logic section of the invention.

FIG. 15 shows the Control Logic section 44. This section supplied the control signals to the rest of the sampler: Read and Write signals 84 to memory, and Enable, Disable and Clock signals 86 to the A/D converter and the UART. The section had four digital inputs:

1. The Sample/Sent input that selected the state of the sampler: data collection state or data transferral state to the portable computer.
2. Start Select controlled the source of the trigger signal: manual or automatic.
3. Manual trigger.
4. Automatic trigger.

An Address Counter 90 supplied the address bits to the buffer memory. When the system was in the Sample mode (controlled by the Sample/Send select switch) the memory had a 12-bit data bus and the address went up to 32768. However, when the system was in the Send mode, the memory had an 8-bit data bus and the address went up to 65536. The counter was incremented by a Clock Generator 92, counting up every clock cycle, updating the location of memory to be written to or read from.

When a trigger T (either automatic or manual) was supplied to a Trigger Control subsystem 94, this subsystem initiated the operation controlled by the Sample/Send switch. It told Enable Logic 96 to start providing the necessary control signals, and the Address Counter 90 to start counting addresses. When the count in the address counter reached its final value (32768 for Sample state, 65536 for Send state), the Trigger Control signaled the Enable Logic to disable the control signals, thus completing the Sample or Send operations.

The Enable Logic enabled the A/D converter, the 12-bit memory data bus, and generated the Write signal to the memory, synchronously with the clock, when the system was in the Sample mode. It enabled the UART, the 8-bit memory bus, bus multiplexer control, and the Read signals to the memory and to the UART, synchronously with the clock, when the system was in the Send mode. Finally, it disabled all the control signals when the Trigger Control subsection produced an End-of-Operation signal.

The Clock Generator produced both the sampling clock and the baud rate clock. Which clock was generated was controlled by the Sample/Send switch.

Another requirement of the present invention is to determine the transmission characteristics of acoustic waves through the pipeline so that analysis can reveal the distance of an acoustic leak signal from a transducer, and advantageously interpolate the distance of the leak between two adjacent transducers along the pipeline. Thus the present invention must provide both discrimination and identification of the acoustic signal which is characteristic of a leak, determining that a leak has taken place, and also determine the location of the leak.

The acoustic attenuation in bounded solids is complicated by mode changes at boundaries. In the case of this invention, a leak generates an acoustic wave of unknown properties in the pipeline metal wall. Neither the modes of oscillation or the original angle of incidence with the wall are known. Furthermore, as the pickup transducer can be located at a considerable distance from the leak, there is no way of knowing how many boundary interactions occur between the source and the receiver. Rather than use a brute-force approach to the propagation problem, one can equate the problem to an electrical transmission line with distributed parameters.

To determine the transmission line parameters of the underground pipeline we need to take enough propagation measurements along the pipe, fit these measurements into transmission line equations, and solve for either the primary or secondary parameters.

Unlike an electrical circuit, the types of measurements possible on an mechanical transmission line, specially in the field, are limited. For instance, in the electric circuit it is easy to measure both voltage and current at numerous places along the transmission line. On the other hand, for a buried pipeline, one can only access those points where the pipe comes above ground. Digging the pipeline to access more points is both expensive and dangerous. To verify the effectiveness of the present invention, above ground points were utilized. In practicing the invention, however, it is anticipated that a plurality of transducer units will have their acoustic transducer coupled to the outer surface of the pipe before it is buried, thus providing long term leak detection.

The transducer used for propagation experiments was a piezoelectric disk with a radial mode of vibration. The voltage that such a transducer outputs is a function of the force applied to it.

The most direct way to calculate the secondary pipe parameters is to produce an acoustic impulse in the pipe and measure the response of the pipe at different distances from the source.

In this case the transmission radially reduces to the manageable form:

$$F_m F_r e^{\gamma l} \tag{30}$$

Equation has only two unknowns and thus a minimum of only two measurements have to be made. Separating the equations $A = A_O \exp(-\alpha x)$ into real and imaginary parts will result in four non-linear equations. However these equation can be linearized in $\gamma$ and $F_r$ by taking natural logarithms of both sides:

$$\ln F_m = \ln F_r + \gamma l \tag{31}$$

The equation for A (amplitude of an acoustic wave) was derived as a function of $\alpha$ (attenuation constant) is frictional intensity and X is displacement along the pipeline. $F_r$ is the force at the loaded end of the line.

Propagation experiments were conducted on the ethylene pipeline at Sour Lake, Tex. Propagation experiments were conducted both on a 84-feet above-ground section A, C in FIG. 2 and the 500-feet below-ground section of P.

Transducer characteristics had to be considered for accurate propagation results. Unfortunately, these characteristics are not readily measurable. Measurements are too cumbersome because these characteristics change with the acoustic environment to which the transducer is coupled. Consequently the transducer will have one response while coupled to water and a different response while coupled to steel. Fortunately, a complete response is not necessary if certain reasonable assumptions are made. Because we are interested in leak detection from the signal processing point of view, and because the transducer is a time-invariant system (its response to a signal will be the same every time), the transducer can be considered as part of the pipe itself. The distortion that the transducer generates will be the same no matter what signal is received and its effects can be taken out during dominant feature selection, as will be shown later.

In order to generate an impulse in the pipe, a 1-inch diameter steel ball was dropped on the above-ground section of the pipe at point A in FIG. 2. Ideally, the impulse should generate a flat frequency response. By measuring the resulting signal at some distance from point A, the attenuation of acoustic signals in the pipe could be measured.

The data collection equipment of FIG. 12–14 was used to find the pipeline response up to 100 KHz at sampling rate of 204.8 KHz. The transducer was acoustically coupled to the pipe using heavy lithium grease.

The ball was dropped at point A and the resulting signal was measured at points A, B and at several points along the AC segment.

Because the length of the transmission line is unknown to us (in fact because the pipeline transmission line is uniform throughout, the transmission line end ca be arbitrarily chosen) it is advantageous to rewrite equation in terms of $F_0$ the force at the source (point A) instead of $F_r$. Clearly:

$$F_0 = F_r e^{\gamma L} \quad (32)$$

and substituting into equation (30):

$$F_m = F_0 e^{-\gamma x'} \quad (33)$$

where $x' = L - x$ is the distance from the source. Equation (31) now becomes:

$$\ln F_m = \ln F_0 - \gamma x' \quad (34)$$

and separating the real and imaginary parts, remembering that $\gamma = \alpha + j\beta$:

$$\ln |F_m| = \ln |F_0| - \alpha x' \quad (35)$$

$$\arg F_m = \arg F_0 - \beta x' \quad (36)$$

As the real interest of this invention is the magnitude of the signal, only equation (35) needs to be solved. Note that equations (35) and (36) both have only one unknown, and thus, can be solved independently of each other.

In order to solve for $\alpha$ in equation (35) a minimum of two measurements are needed. One is at $x'=0$ and another at an arbitrary $x'$ location. However, as every measurement procedure has error, a more accurate determination of $\alpha$ can be done by taking more than two measurements and solving an overdetermined system of linear equations generated from (35). These equations have the form:

$$Fx = y \quad (37)$$

where x is an N-dimensional vector of unknowns, F is an M×N coefficient matrix (M being the number of equations) and y is a known vector of M elements. In general M>N the solution to this system does not exist. In order to find the closest solution, equation (37) has to be modified to contain an error term chosen such a way so that the system of equations now has a solution:

$$Fx = y + e \quad (38)$$

The solution of this system involves minimizing e in the least-squared error (LSE) sense, e.g. minimizing $e^T e$. It can be shown that the LSE solution is the solution to the normal set of equations:

$$F^T F x = F^T y \quad (39)$$

Because of the availability of multiple measurement points for above-ground propagation experiments, equation (39) was used to solve $\alpha$.

Figure 16:
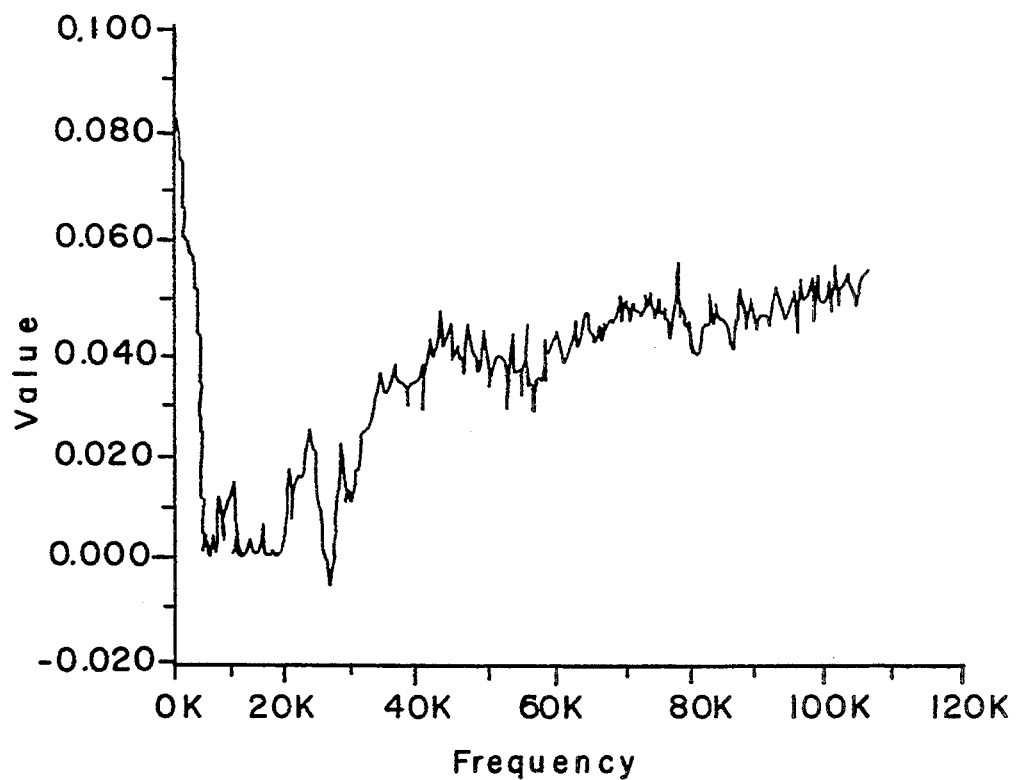
FIG. 16 is a graph plotting attenuation constant against frequency for above-ground sections of the pipeline.
Figure 17:
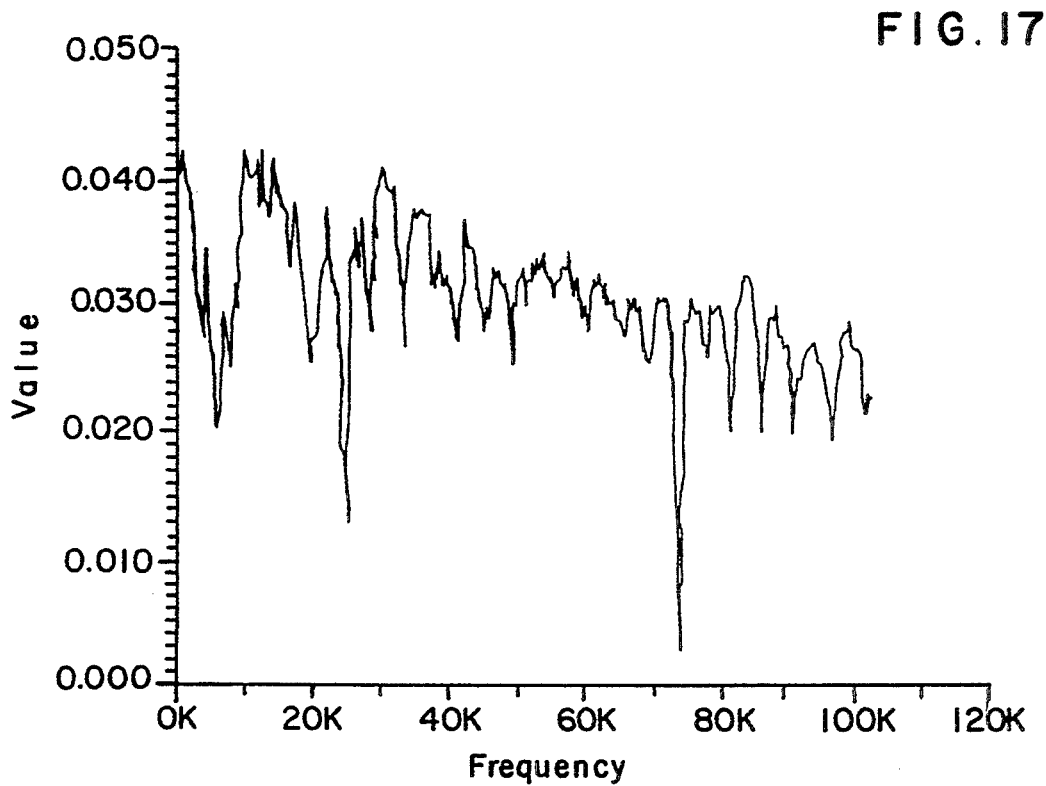
FIG. 17 is a view similar to FIG. 16 for below-ground sections of the pipeline.

Using data from the ball drop experiments the attenuation constant, $\alpha$, was found for both above and below-ground sections of the pipeline. The plot of $\alpha$ vs. frequency is shown in FIG. 16 for above ground measurements and in FIG. 17 for below ground measurements.

The most important parameter for transducer distance determination is attenuation constance, $\alpha$, for the below-ground pipeline section. The value of $\alpha$ is between 0.02 and 0.04. With this value and the leak signals collected from the leak simulator, the distance between the transducers can be estimated by the interpolation.

Figure 18:
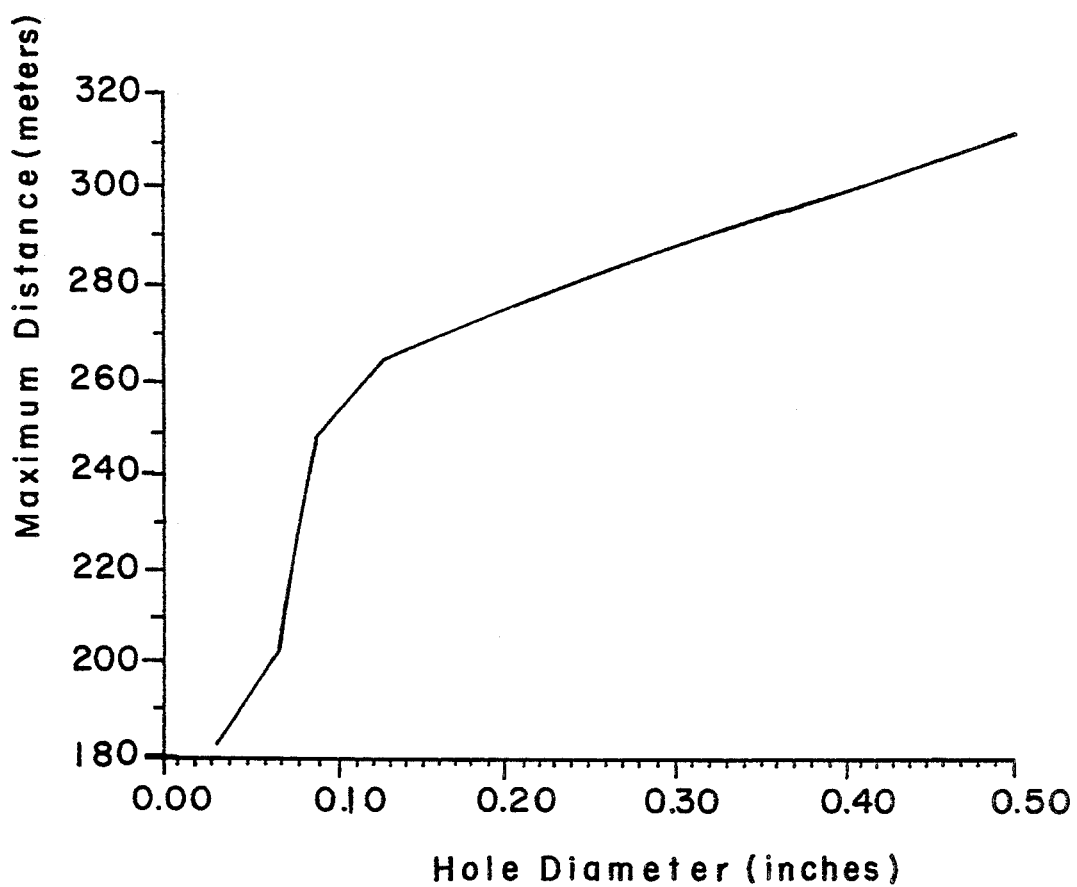
FIG. 18 is a graph plotting transducer distance versus hole size for leaks in the pipeline.

To predict the transducer distance, we set the minimum number of A/D levels below which the average envelope of the amplified signal should not fall. Seven bits give tolerable distortion, and thus, the minimum number of levels was set at 63 (number of positive levels). Using equation (35) the maximum distance of the transducer rom the leak source is:

$$x = -\ln\left(\frac{64}{3000L_0}\right)\frac{1}{\alpha} \quad (40)$$

where $L_0$ is the number of unamplified A/D levels at the source. As the hole size increases so does $L_0$. Unfortunately, the sound intensity decreases exponentially along the pipe while the sound intensity at the source increases linearly with the hole diameter. Thus a large hole size will not yield much larger transducer distance. Transducer distance vs. hole size is shown in FIG. 18.

When the system is installed in the field, some nature or man-made non-leak sound signals might be present in the pipe. It is important not only to discriminate leak sounds from these extraneous sounds, but also, to detect leaks in the presence of these sounds. For instance, a monitoring stations can be put near a compressor unit which generates a high level of acoustic clutter or noise. Since the leak might develop slowly over time, there might not be an instantaneous energy increase in the received signal to alert the system. Other means of detection must be used. The problem is further complicated by the inability to predict beforehand the noise signal and the possibility that this noise signal might change over time. Although the acoustic noise can be sampled in the absence of a leak signal, because the leak can develop slowly, we can never be certain whether or not pure noise was sampled.

In the worst case, the leak can develop so slowly that the system will think it is sampling noise even in the presence of a large leak.

The method of the invention solves this problem by regarding the background noise as an unknown. Because the problem at hand in the detection of specific signals—namely leak acoustic signals, and not noise removal—a modification of an existing LMS adaptive filter noise removal system can be used. Assuming that the interference noise is additive, such a filter adapts to the noise environment approaching in performance to the optimal Weiner filter. However, in order for the adaptive filter to work, a "clean⇌ noise signal that is correlated with the additive noise must be provided. If, instead of the noise signal, a pre-recorded template of the signal we are trying to detect is supplied to the filter, and this signal is present in the sampled wave, the filter will adapt to remove this signal from the sampled wave leaving only noise. By looking at what was removed, instead of what was left, a noise removal system, independent of noise can be achieved. Furthermore, in this case, the filter will be matched to the signal in a sense that if a non-leak signal is present in the clutter, this signal will not be subtracted from the sampled signal-plus-noise wave. Even if the signal is somewhat similar to a leak signal, only the similar parts of the signal will be subtracted, letter the system easily recognize that the incoming signal is not due to a leak. A time factor, e.g., 5 minutes, may also be used to distinguish between short term sounds that may seem to be leaks, for example a passing airplane, and a longer term leak.

The central station 10 and the remote unit $T_1$ to $T_n$ can be constructed developed according to the invention. Most of the signal processing and recognition tasks will be performed on the remote units which will consist of TMS320C30 DSP boards. The status of the pipeline will be communicated to the central station by these units, making up, in effect, a multiprocessor detection system.

While the remote units will monitor the instantaneous state of the pipe, the central station will consider the continuous state, for example, the duration of the leak signal. It is possible that an even can occur in the pipe that will look to the remote stations as a leak signal (for instance, a train passing overhead, generating leak like sounds). However, it is highly unlikely that such an event will be continuous over time. On the other hand, a leak signal, once present, will not terminate until the leak is repaired. The central station will take leak signal duration into account, thus providing another level of security against false alarms.

Finally, a communication protocol is needed between the remote units and the central station. The method that appears to be most reasonable is digital communication through microwave links using the existing microwave repeaters along the pipeline. The implementation so such a system requires a channel coding scheme and a communication language between the remote units and the central station.

While the specific embodiments of the invention have been shown and described in detail to illustrate the application of the principles of the invention, it will be understood that the invention may be embodied otherwise without departing from such principles.

What is claimed is:

1. An apparatus for detecting a leak in an underground pipe and for determining a location of a detected leak in the pipe, comprising:
   a plurality of remote acoustic transducer sensor units at spaced sensor locations along the pipe, each responsive to acoustic energy from the pipe at each sensor location, to generate acoustic signals from each sensor location, each acoustic signal having an amplitude;
   a central processor remotely located from the sensor units and including program means for containing acoustic transmission characteristics for the pipe and acoustic features of an acoustic signal generated by a leak in the pipe;
   the central processor also including analysis means at a remote location from the sensor locations, and operatively connected to each transducer unit and to the program means for subjecting each signal to pattern recognition analysis to determine the presence of the acoustic features in each signal, the presence of the acoustic features indicating the presence of a leak in the pipe and thus detection of the leak, the analysis means also using an amplitude of each signal containing the acoustic features to identify two adjacent sensor locations at which the signals containing the acoustic features have greatest amplitude, the leak in the pipe being located between the two adjacent sensor locations, the analysis means using the transmission characteristics of the pipe and a relative amplitude between the signals at the two adjacent sensor locations to interpolate and identify a leak location for the leak in the pipe; and
   the analysis means extracting a plurality of linear predictive coding (LPC) cepstrum coefficients as the acoustic features.

2. An apparatus according to claim 1, including a control unit connected to each remote acoustic transducer sensor unit, at least part of said program means and at least part of said analysis means being in said control unit for identifying two adjacent sensor locations at which the signals containing acoustic features have greatest amplitude and for calculating a distance of the leak in the pipe from at least one of the two adjacent sensor locations as a function of the transmission characteristics of the pipe.

3. An apparatus according to claim 1, wherein each remote acoustic transducer sensor unit comprises an acoustic transducer engaged to the pipe for receiving acoustic signals from the pipe, analog-to-digital conversion means connected to the transducer for converting analog acoustic signals from the transducer into digital acoustic signals, memory buffer means connected to the analog to digital conversion means for storing the digital signals and control logic means connected to the analog-to-digital conversion means and the memory buffer means for transmission of sampled digital signals to the program and analysis means.

4. An apparatus according to claim 3, including a control unit connected to each remote acoustic transducer sensor unit, said control unit containing at least part of said program and analysis means.

* * * * *